United States Patent [19]

Matze et al.

[11] Patent Number: 5,907,672
[45] Date of Patent: May 25, 1999

[54] SYSTEM FOR BACKING UP COMPUTER DISK VOLUMES WITH ERROR REMAPPING OF FLAWED MEMORY ADDRESSES

[75] Inventors: John E. G. Matze, Poway; Douglas L. Whiting, Carlsbad, both of Calif.

[73] Assignee: Stac, Inc., San Diego, Calif.

[21] Appl. No.: 08/539,315

[22] Filed: Oct. 4, 1995

[51] Int. Cl.⁶ ................................................. G06F 11/16
[52] U.S. Cl. ........................ 395/182.06; 395/182.04; 395/489; 395/185.06; 395/183.18
[58] Field of Search ................... 369/53, 54; 365/15; 395/440, 622, 182.04, 489, 182.06

[56] References Cited

U.S. PATENT DOCUMENTS

| | | | |
|---|---|---|---|
| 4,333,162 | 6/1982 | Reyling | 365/15 |
| 4,346,454 | 8/1982 | George | 365/15 |
| 4,685,055 | 8/1987 | Thomas | 380/4 |
| 4,972,316 | 11/1990 | Dixon et al. | 395/440 |
| 5,088,081 | 2/1992 | Farr | 369/54 |
| 5,261,088 | 11/1993 | Baird et al. | 395/622 |
| 5,331,616 | 7/1994 | Morita et al. | 369/53 |
| 5,504,857 | 4/1996 | Baird et al. | 395/182.04 |

FOREIGN PATENT DOCUMENTS

| | | |
|---|---|---|
| 0566967 | 10/1993 | European Pat. Off. . |
| 9513580 | 5/1995 | WIPO . |

OTHER PUBLICATIONS

"Restoring Data from DASD Volumes Having Hardware Errors," IBM Technical Disclosure Bulletin, vol. 31, No. 7, Dec. 1988, pp. 313–317.

*Primary Examiner*—Tod R. Swann
*Assistant Examiner*—James Peikari
*Attorney, Agent, or Firm*—Irell & Manella LLP

[57] ABSTRACT

A system for backing up data from a computer disk volume at very high speed by saving a logical image copy of the volume to a backup medium such as magnetic tape. This logical image copy can later be restored in its entirety to a disk volume with a different physical geometry and flaw map in a disaster recovery mode, significantly reducing the time required for such disaster recovery compared to other backup techniques. In addition, the logical image copy on the backup medium also allows selective file restore with performance comparable to that achievable using traditional file-by-file backup/restore methods. The backup process can thus run considerably faster than conventional approaches without sacrificing the restore flexibility normally associated with those approaches.

43 Claims, 6 Drawing Sheets

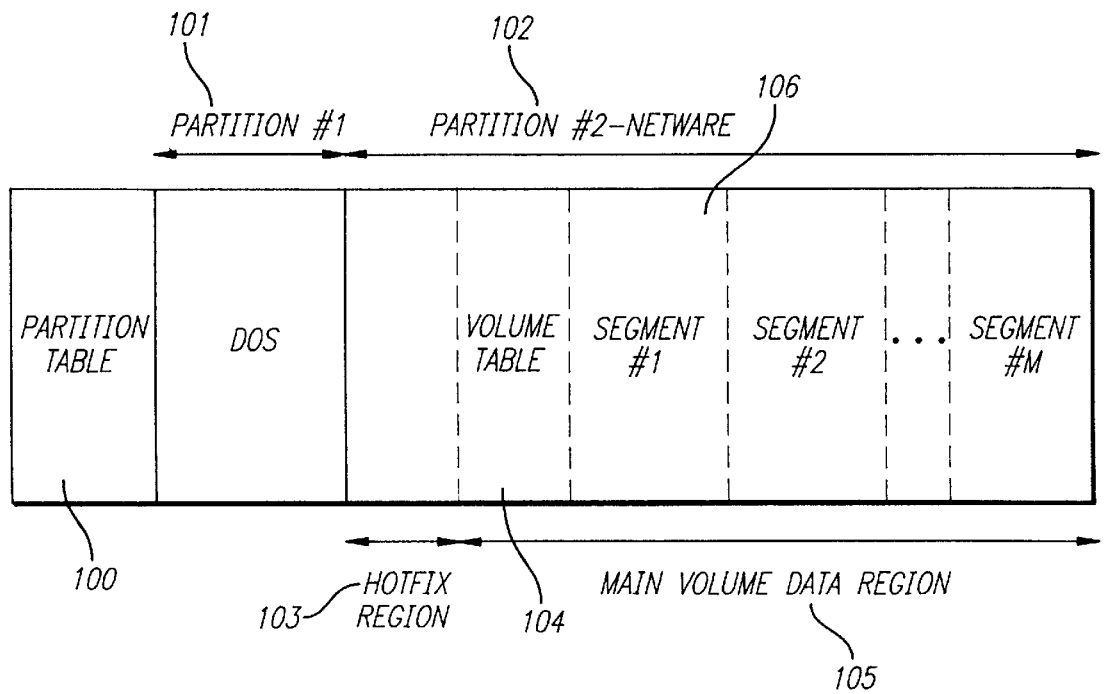

```
300.  typedef struct      // Volume Table starts at logical sector 160 in each volume.
301.  {                    // (then repeated 3 times, every 32 sectors, total of 4 copies)
302.    char            NameLen;                        // length of Name
303.    char            Name[ 15 ];                     // name of volume
304.    unsigned long   Sync;                           // unused in present invention
305.    char            BlockShiftFactor;               // log2(# sectors/block)
306.    char            NumberOfSegments;               // segment count for this volume
307.    char            SegmentPosition;                // which segment of this volume
308.    char            Flags;                          // unused in present invention
309.    unsigned long   StartingSector;                 // 1st physical sector of segment
310.    unsigned long   SectorsInSegment;               // size of segment
311.    unsigned long   BlocksInVolume;                 // total # blocks in volume
312.    unsigned long   FirstBlockInSegment;            // 1st logical block # here
313.    unsigned long   FirstPrimaryFATBlock;           // start of FAT for 1st segment
314.    unsigned long   FirstMirrorFATBlock;
315.    unsigned long   FirstPrimaryDirectoryBlock;     // start of directory for 1st seg
316.    unsigned long   FirstMirrorDirectoryBlock;
317.    char            Reserved[ 4 ];                  // unused in present invention
318.  }
319.  VOLUME_TABLE_ENTRY[ 8 ];    // up to 8 entries per volume table
```

FIG. 10

SYSTEM FOR BACKING UP COMPUTER DISK VOLUMES WITH ERROR REMAPPING OF FLAWED MEMORY ADDRESSES

FIELD OF THE INVENTION

The present invention relates to a system for backing up data at high speed from a computer disk volume onto a backup medium and subsequently restoring some or all of said data in the event of data loss or corruption.

BACKGROUND OF THE INVENTION

Backing up data and program files (often together referred to as "data" here) from computer disks has been a well-known practice for many years. There are two major reasons why data needs to be backed up. The first reason is that the disk hardware may fail, resulting in an inability to access any of the valuable data stored on the disk. This disastrous type of event is often referred to as a catastrophic failure; in this case, assuming that backups have been performed, the computer operator typically "restores" all his files from the most recent backup. Fortunately, new computer disks and controllers have become more reliable over the years, but the possibility of such a disaster still cannot be ignored. The second reason for backup is that users may inadvertently delete or overwrite important data files. This type of problem occurs much more frequently than a catastrophic hardware failure, and the computer operator typically restores only the destroyed files from the backup medium (e.g., tapes or floppy disks) to the original disk.

In general, the backup device is a tape drive, although floppy disk drives and other removable disk drive technologies are also used. Tape has the advantage of having a lower cost per byte of storage and thus is preferred in most applications, particularly those where large amounts of data are involved (e.g., network file servers, such as those running Novell's NetWare software). However, tape also has several inherent limitations which must be addressed in order to make its performance acceptable to a user. First, tape is a sequential access medium, with any attempt at random access requiring times on the order of tens of seconds (if not minutes), as opposed to milliseconds for a disk drive. Second, and somewhat related, the time to stop a tape drive and back up a little is on the order of seconds, which is again very large compared to disk times. The result of all this is that, once the tape drive starts moving the tape, any attempt to stop, back up, or skip forward will result in a very large time penalty. Thus, the most desirable way to use a tape drive is to keep it "streaming"—in other words, to read or write very large sequential blocks of data.

In this context, a third problem can arise, dealing with the transfer rate of the tape. One of the most critical parameters of a backup system is the amount of time (known as the "backup window") required to back up a given disk volume. This is particularly true in multi-user systems or network file servers, where the system may be effectively shut down while the backup is occurring. Normally, the backup time is by far the most important criterion to a user, since restore is by definition a somewhat extraordinary event (although the restore time is nonetheless of some interest). If the tape data rate is too slow, it will be easy to keep the drive supplied with enough data so that the tape can stream, but a backup and/or restore operation will be take too much time. On the other hand, if the data rate is too high, the disk drive will not be able to keep up with the tape, which will then fall out of streaming and backup time will increase unacceptably.

While most tape drives include memory buffers to attempt to smooth out any loss of streaming due to instantaneous variations in the rate of data coming from the disk, such buffers only mildly alleviate the problem. In a word, a tape drive should be just fast enough but no faster, or performance will suffer. This balancing act can lead to problems as technology evolves, as discussed below.

Historically, disk drive transfer rates have been much higher than tape transfer rates for mass-market devices. For example, a DAT (digital audio tape) 4 mm tape drive using the DDS-2 format has a native transfer rate of 366K bytes/second, and current Exabyte 8 mm tape drives have a 500 K byte/second transfer rate. By contrast, it is not uncommon for disk drive raw transfer rates to be on the order of 3–5 M bytes/second (although this number does not take into account any seek latency, as discussed below). However, recent advances in tape drive technology are pushing the tape transfer rates higher. For example, current Quantum DLT (digital linear tape) drives achieve transfer rates of 1.25–1.5 M bytes/second, and the next generation of 4 mm and 8 mm tape drives promises to increase transfer rates substantially over current capabilities.

Unfortunately, using conventional backup techniques, such tape technology advances are not always good news. Almost all popular backup programs, such as Cheyenne's ArcServe and Arcada's Backup Exec, work on a file-by-file basis. In other words, during the backup process, the backup program copies one file at a time from the disk to the tape. This approach collects pieces of each file, which may not be contiguous on the disk, into a single sequential block that is stored on the tape, thus simplifying and speeding up a future restore process. One useful consequence of this method is that the data is thus stored on the tape in a format that may allow files to be transported between computers with different operating systems. With current technologies, it is not uncommon in a file-by-file approach on network servers for a full backup (i.e., a backup of all files on the disk) to consume more time than is available overnight. Fortunately, an important benefit of file-by-file backup is that an "incremental" backup can fairly easily be performed, in which only those files which have changed since the last backup are written to tape. Normally, changed files represent only a small fraction of the overall disk contents, in which case an incremental backup can be completed relatively quickly, and most operating systems maintain an "archive" bit that can easily be used to tell whether each file has changed or not. A typical scenario involves performing a full backup once per week (often over the weekend on a network file server), with daily incremental backups to minimize the backup window. Full backups still need to be performed fairly regularly, because recovering the current file contents from an initial full backup and a large set of incrementals can be very time consuming.

As each file is opened and read from the disk in a file-by-file backup, the file system component of the computer's operating system gets involved in each step, which adds overhead time. Even worse, in general the files are not pulled from the disk in an optimal order with respect to their physical location on disk. Thus, the disk seek time required to move the disk head to read the file contents usually significantly degrades the overall data rate from the disk, particularly in the case of smaller files where much more time is spent moving the head to the right location than actually reading data. The net result is that, while the disk has a raw (i.e., sequential) transfer rate of several megabytes per second, once the file system software and disk seek overheads come into play, the average disk read data rate can easily fall below that of the tape drive, which then falls out of streaming, slowing down the backup process substantially. The paradoxical conclusion is that a doubling of the tape data rate may in fact slow down the backup time considerably. Current trends indicate that tape drive transfer rates are increasing faster than the disk seek times are decreasing, making it even harder for file-by-file backup methods to keep future tape drives streaming. For example, using Cheyenne Arcserve on a NetWare server with a Quantum DLT drive, which inherently is capable of storing 90 MB/minute, typically results in throughputs which are only a fraction of the theoretical speed, meaning that the tape drive is constantly stopping and starting instead of streaming.

An alternate backup method that has been used in the past to minimize backup time is to perform the backup on an "image" basis instead of a file-by-file basis. In this approach, the disk image is read sequentially on a sector-by-sector basis, resulting in disk transfer times that match the drive's rated throughput and are thus much faster than current tape drive technology, and this speed advantage appears to be sustainable as technology improves. Without the extra file system software overhead and without extraneous disk head movements, an image backup can thus easily keep a tape drive streaming. However, for several notable reasons, image backup has never become popular.

One major historical problem with image backup is that the only option for restoring has almost always been an image restore, wherein the entire disk image is copied from tape back to disk. While such an approach makes sense in the case of catastrophic failure, it is extremely inconvenient for the most frequent purpose of restore: to retrieve copies of a few lost or corrupted files. In order to perform such a partial restore, the user must either overwrite his entire existing disk (including any files modified since the backup), which is totally unacceptable, or he must have available an extra empty disk to which the image can be restored, which is expensive and often impractical. Clearly, the complete image restore may take considerably longer in general than would a selective file restore in a file-by-file system. Also, the disk to which the image is to be restored must have a flaw map which is identical to (or a subset of) the flaw map of the original disk. While most modern disks perform some level of defect mapping inside the drive, this approach cannot handle all flaws which develop after production test (e.g., during shipment), and such flaw mapping is normally handled by the operating system's file system code. Often, image restore software has required the physical disk geometries of the original backup disk and the restore disk to match, which is also problematic in the case of catastrophic failure, because it may not be possible to purchase an identical disk given the rapid change in the capacity (and thus geometry) of disk drives.

Another problem is that, from a bottom-line perspective, for several reasons the speed of image backup has not even always been faster than that of a file-by-file backup. For example, with typical image backup it is not possible to perform an incremental backup, so that each backup session is a full image backup and thus may be slower than a file-by-file incremental backup. Also, if the disk is only partially full, an image backup may be slower than a file-by-file backup because the former will write a lot of "unused" disk sectors to tape. Most importantly, in the past the tape drive transfer rates have often been low enough that file-by-file backups were able to keep the tape streaming, removing the one major objection to the file-by-file approach.

Some attempts have been made to allow file-by-file restore from an image backup, normally by "mounting" the tape image as a disk drive (often in a read-only mode). A few such products have been commercialized without meeting any significant market acceptance, mainly because the tape seek times incurred in reading the disk control and directory structures are so painfully slow compared to disk drive speeds. These structures are in general not physically contiguous on the disk, which costs milliseconds when looking through the directory structures on the disk, but this same discontiguity costs tens of seconds when performing the same operation on the tape image.

Recently, one software backup product, SnapBack from Columbia Data Systems (see LAN Times, Feb. 13, 1995, p. 89), has attempted to make image backup more acceptable to the user. This product performs image backups of one or more physical disk partitions to tape and allows subsequent image restores to the same (or larger) partitions. SnapBack runs its backups and restores under the MS-DOS operating system, although it also contains a scheduler for NetWare which will shut down the NetWare server code at a user-selected time, exit to MS-DOS to perform the backup, and then reenter NetWare. Each hard disk on personal computer contains a partition table, typically on the first sector of the disk, which identifies the locations, sizes, and types of all the physical partitions on the disk. On an IBM-compatible personal computer, these partition types include MS-DOS FAT partitions, Novell NetWare partitions, OS/2 HPFS partitions, Microsoft Windows NT NTFS partitions, Unix partitions, etc. SnapBack claims to be able to back up these partition types, and it works at the physical level by reading the physical disk sectors and saving this "image" to tape.

For restore, SnapBack includes the typical full image restore mechanism, along with the concomitant flaw map problem, although it does allow the restore target disk to have different physical geometry than the backup source disk (as long as it is no smaller than the source). Snapback includes no way to perform any type of incremental backup, but it does include a feature whereby a Novell NetWare partition image tape can be "mounted" as a read-only drive, allowing the user to access individual files on the tape for restore.

The physical nature of SnapBack's operation allows it to function after a fashion for a wide variety of operating system disk partitions, but its lack of operating system specific knowledge also places some severe limits on functionality. For example, to use SnapBack, the operating system (e.g., NetWare) must be entirely shut down during the backup process, which is totally unacceptable for many users. Further, because SnapBack operates at a physical level instead of a logical level, it is not aware of any logical information contained within the partition. Thus, the backup process will always back up the entire disk image even if the disk is largely empty, slowing performance considerably. Also, the tape image mount mechanism suffers from the same severe performance problem discussed previously. In this case, the slowness is exacerbated by the fact that, during the mount process, NetWare actually reads in the entire set of directory and control structures for the entire disk. Since these structures are not guaranteed to be contiguous on the disk, the mount process from tape can easily take tens of minutes, which is particularly disconcerting if the user only wishes to restore a small handful of files. In fact, this mount time may well be longer than the time required for a full image restore!

An additional limitation caused by the physical nature of the SnapBack image backup is that a NetWare volume which is split into segments on multiple physical disks (a configuration commonly used to increase volume size and performance) cannot easily be restored except to a set of physically identical disks, since there are logical and physical pointers included in the NetWare disk structures which specify where the segments reside, and SnapBack is unaware of such pointers. Similarly, a multi-segment volume cannot be mounted for file-by-file restore in SnapBack. These limitations are quite severe for the NetWare market, which currently has by far the largest number of file server installations and constitutes the dominant market for network backup software. While the SnapBack product contains some significant advances in the image backup, it still leaves some very significant barriers to user acceptance.

Thus, there are two well-known backup strategies: file-by-file, which has well-accepted usability characteristics but whose performance is proving extremely difficult to maintain as technology advances, and image, whose performance can keep up with technology but which has met with almost universal rejection in the market for the reasons discussed above.

SUMMARY OF THE INVENTION

It is the goal of the present invention to overcome the problems historically associated with image backup, thus allowing for new high-speed tape devices to stream during the backup process, without forcing the user to accept compromises in the flexibility or performance of the restore process.

The backup process of the present invention reads sectors from the source disk at the logical sector level, thus removing any reliance on the underlying physical characteristics of the disk or its interface. Because the sectors are read sequentially, a backup performed using the present invention is capable of sustaining a data rate high enough to insure streaming of even very high-speed tape devices. The system does not have to be shut down during the backup operation: the software can allow for the operating system and file system to continue operation, although access to portions of the disk volume will be temporarily delayed. During the backup process, a log is kept of all files which are opened for write since those files may not contain consistent information at restore time. By saving logical sectors, the backup image takes advantage of any flaw management performed by the operating system's file system software, thus making it possible to restore to the logical image later to a disk with a different flaw map. Another advantage of using logical sectors in the present invention is that a disk volume which spans multiple physical disk segments is saved as a single logical image and thus can easily be restored to an entirely different physical disk configuration. In addition, by understanding the on-disk volume format, the backup software may exclude unused or deleted areas of the disk to minimize backup time significantly.

A backup image of the present invention may be restored by completely restoring the logical image to a disk, but it may also be "mounted" as a read-only volume directly on the backup tape, allowing the user to restore only selected files from the backup. The time required for this mount process is substantially minimized by saving all the volume control and directory sectors at the beginning of the tape, so that only a single tape seek is required to complete the mount. The backup process of the present invention can determine which sectors need to be included at the beginning of the tape by understanding the on-disk volume format, or it can use a pseudo-volume technique for determining this sector set automatically without having any knowledge of the on-disk volume format.

An incremental image backup, which supports all the functionality and performance of a full image backup, can also be performed as part of the present invention. A software module is kept resident at all times to monitor which parts of the disk volume have been updated, thus allowing only those changed portions of the disk volume to be backed up. This approach speeds up the backup for a largely unchanged volume: instead of being limited by tape transfer speeds, it is limited by the (typically much higher) disk transfer speeds. In an alternate embodiment, a checksum method is used on the contents of the disk sectors to detect changes without requiring any resident software.

BRIEF DESCRIPTION OF THE DRAWINGS

A preferred embodiment of the present invention is illustrated in and by the following drawings, in which like reference numerals indicate like parts and in which:

FIG. 1 is a diagram of the layout of a typical NetWare disk drive;

FIG. 2 is a table of sample NetWare FAT (File Allocation Table) entries;

FIG. 10 is an outline of the format of a Novell NetWare volume table.

DETAILED DESCRIPTION OF THE PREFERRED EMBODIMENT

Figure 3:
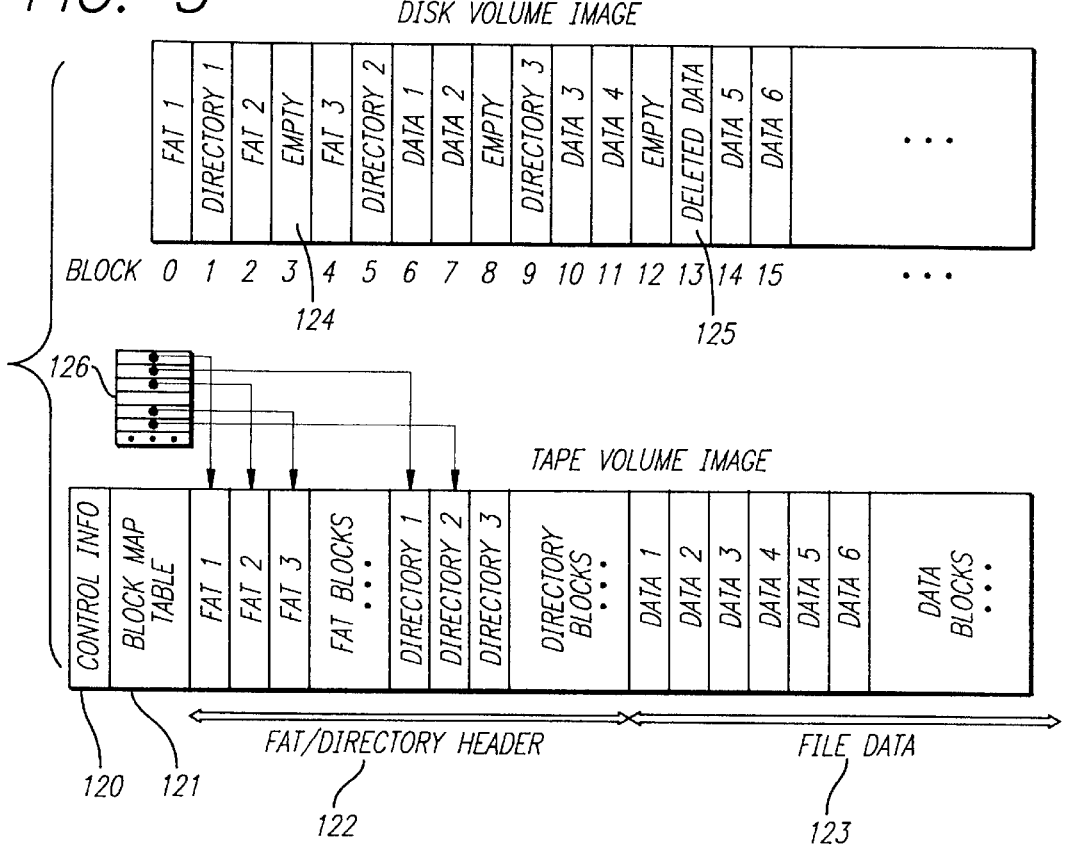
FIG. 3 is a diagram of the contents of a NetWare disk volume and a diagram of the image of the disk volume stored on tape in accordance with the present invention.

The preferred embodiment of the present invention is a backup software package for a file server running the Novell NetWare operating system. NetWare has by far the largest installed base of network file servers, and the market for NetWare backup software is therefore quite substantial. However, the general techniques described below can be readily applied to other operating systems, such as Microsoft Windows NT, IBM OS/2, MS-DOS (or compatible operating system, hereafter referred to generically as DOS), etc., so the discussion here is not meant to limit to scope of the present invention to any particular operating system or file system.

1. NetWare File System

In the preferred embodiment, the file server has one or more physical disks attached, as well as a tape drive. As shown in FIG. 1 (where the layout of a typical NetWare disk drive is shown in a diagram), in a NetWare system, each physical disk contains a physical partition table 100, typically placed on the first sector(s) of the disk. This table identifies the physical partitions located on each disk, including the starting point, size, and partition type (e.g., DOS, NetWare, etc.). In a NetWare server, the system first boots from a DOS diskette or a DOS bootable partition 101 on the hard disk. After DOS has booted, the NetWare server code is loaded as a DOS application which takes over the entire computer, effectively taking control away from DOS. NetWare then loads its device drivers, including those drivers which allow sector reading and writing of the disk and tape drives, mounts any NetWare disk volumes found on the NetWare partition(s) 102, and offers its file services on the network.

NetWare currently allows only one physical NetWare disk partition 102 per physical drive. This physical partition is broken up into two logical regions. The first region 103 contains the "hotfix" sectors. These are sectors set aside to map out bad sectors in the main data region and typically constitute a small percentage (1–2%) of the overall physical partition. The second region 105, which comprises the remainder of the physical partition, is used for storing volume data. Each time a write occurs to a NetWare disk, the operating system performs a physical write-with-verify operation to the disk. If the verify fails, the bad portion of the disk is then mapped out by assigning a portion of the hotfix area 103 to replace it at the logical level. Obviously, if enough disk flaws develop over time, the pool of unused sectors in the hotfix area could be exhausted, but presumably Novell has enough experience in selecting the appropriate amount to allocate to the hotfix area that such an occurrence is extremely unlikely.

This technique of dynamically mapping out bad areas of the disk costs a little in performance, since the verify pass requires an extra rotation of the disk head, but it has several notable advantages. First, it allows instant, reliable use of a new NetWare partition without any extended burn-in periods that attempt to map out present (and future) disk flaws, as were required in older versions of NetWare. Second, it significantly reduces the (already low) probability of failure on subsequent reads, since the sectors are guaranteed to have been read successfully from the disk at least once. Further, the performance disadvantage mentioned above is mitigated by the fact that most disk accesses are reads, so the overhead from effectively slowing down write operations is not very noticeable.

As shown in FIG. 1, the main volume region 105 of a NetWare partition 102 may be split into multiple segments 106 (currently up to M=8 segments per NetWare partition). A volume resides in one or more segments, and the mapping between volumes and segments is established by a volume table 104, which resides at the beginning of the main volume region 105. There is one entry in the volume table 104 for each segment 106 of the partition 102. To improve data integrity, NetWare stores multiple copies of the volume table 104. Since there may be multiple physical drives in a system, each with a NetWare partition containing multiple segments, a NetWare volume can easily be spread across physical drives. NetWare has utilities that allow an existing volume to be extended onto other segments, so it is fairly easy (and quite common) to add a new disk drive and grow an existing volume onto the new drive, which has its own hotfix region.

The NetWare volume table format is not currently documented by Novell, although Novell has indicated that it will be documented in the near future. The exact format of this structure is outlined in FIG. 10 and was determined during the development of the present invention by examining the contents of the logical partitions, with ready help from Novell engineers. The definition is given as a C++ language structure statement, with the double slash (//) indicating a comment to the end of line. The definition starts at 300 for the VOLUME_TABLE_ENTRY array (319). The volume header is a single sector (512 bytes), which is an array of up to 8 of these records, as shown at 319. Each record describes one segment of one logical volume. The volume header is placed at logical sector number 160 in the logical partition, and it is replicated three more times for robustness at 32-sector intervals thereafter. The NameLen field 301 contains the length of the Name string 302, which is the volume name and must be unique across volumes. The Sync field 304 and the Flags field 308 are unused in the present invention. The NumberOfSegments field 305 indicates how many segments are contained in the volume. The SegmentPosition field 306 indicates which segment of the volume is described by this entry; for example, a value of zero here indicates the first segment of a given volume, the value one indicates the second segment, etc. The StartingSector field 309 indicates which physical sector number in the partition corresponds to the start of this segment. The SectorsInSegment field 310 contains the number of sectors in this segment. The FirstBlockInSegment field 312 indicates the first logical block number contained in this segment. The remaining fields are all identical for each entry of segments contained in a given volume. The BlockShiftFactor field 305 is the base 2 logarithm of the number of sectors per logical block in the volume. The BlocksInVolume field 311 indicates the total number of blocks in the volume. The FirstPrimaryFATBlock 313 indicates which logical block in the volume contains the first FAT block of the volume; the FirstMirrorFATBlock field 314 indicates the start of the mirror copy of the FAT. Similarly, the FirstPrimaryDirectoryBlock field 315 indicates the start of the directory blocks for the volume and the FirstMirrorDirectoryBlock 316 indicates the start of the mirror copy of the directory blocks. All of these fields can easily be used to identify the segments of all volumes on the partition, as well as their FAT and directory block chains.

At a logical level, NetWare views each volume as a linear group of sectors. All the mapping of parts of volumes to segments and the flaw mapping into the hotfix region 103 are transparent at this level. The preferred embodiment performs its sector reads and writes at this logical level, using an internal NetWare call (LogicalPartitionIO).

At this logical level, a file allocation table (FAT), similar in spirit to the well-known DOS FAT, is used to record which logical blocks of the volume are currently in use. All space in the volume is allocated in terms of blocks, which are analogous to a DOS cluster. A block is a logically contiguous set of M sectors, where M is always chosen to be a power of two. Typical block sizes range from 8 sectors (4096 bytes) to 128 sectors (65536 bytes). In contrast with DOS, where the FAT is a table of fixed size stored at the beginning of the volume, the NetWare FAT is itself spread throughout the volume in blocks, which are linked together using FAT entries. Each segment of the volume contains enough FAT blocks to manage its own blocks, thus allowing for simple extension of existing volumes to new segments. For data integrity purposes, multiple copies of the FAT are stored. The volume table entry for each segment contains pointers to the first FAT block of that segment, but all FAT blocks of the volume are logically linked together into a single chain via FAT entries. Thus, space for the FAT is effectively allocated as if the FAT itself were a file.

FIG. 2 shows a table of sample NetWare FAT entries. Each FAT entry consists of eight bytes. The first four bytes indicate the sequence number 110 of the FAT entry, or the block number within the file of the associated block. Normally, these sequence numbers are sequential (0,1,2, . . . ) for sequential blocks in the FAT chain of each file, but they may not be sequential if sparse files are used, as illustrated at entry 114. The second four bytes, which correspond most closely to the DOS FAT entry, contain the block number 111 of the next FAT entry in this file. A zero 112 in a FAT entry indicates that the associated block is unallocated (i.e., available), while a value of all ones (hex FFFFFFFF) 113 indicates the end of the FAT chain for this file. [Note: In NetWare 4.x, sub-block allocation is also used to minimize the unused ("slack") space in the last block of a file. This is indicated by setting the most significant bit of the next block number without the entire entry being FFFFFFFF; the remaining bits indicate where the final partial block is stored. For our purposes, this fact is not relevant other than to know that the upper bit of a next block number being set indicates that the block in question is in use and is the end of a FAT chain].

Directory entries for files and subdirectories are also stored in blocks. Each directory entry contains the file name, size, and other attributes, including pointers that indicate its position in the volume directory tree. All directory blocks are linked together using FAT entries as if the directory blocks themselves were a file. The volume table entry for the first segment of the volume contains the logical block number of the first directory block of the volume.

Both the FAT and the directory entry blocks for the entire volume can thus be identified by reading the volume table entry for the first segment of the volume, then using the FAT entries to follow the singly linked chains for each set of blocks. When a volume is mounted, NetWare does just this. It reads the entire FAT into memory, then reads in all the directory blocks, performing checks on the integrity of the volume structure. If a problem is found during the mount process, NetWare informs the system administrator that a repair utility (VREPAIR) should be run in order to enable mounting the volume. The directory blocks are cached in memory, but are not required to fit in memory all at once.

2. Backup

The backup software of the preferred embodiment runs as a NetWare Loadable Module (NLM), with an accompanying disk driver. Either from the NetWare console or from an application running on a network workstation, the user specifies when a backup is to occur, either by scheduling a backup operation in advance or by manually invoking an immediate backup. The NLM then backs up each physical partition in turn to the tape (or to whatever backup medium is used). In most instances, the disk contains a small DOS (boot) partition followed by a NetWare partition. Physical disk devices other than the boot drive usually contain only a NetWare partition.

It is possible, although rare, that other types of disk partitions (e.g., OS/2 HPFS, Window NTFS) exist on a NetWare drive. The preferred embodiment will perform a "dumb" (i.e., conventional) image backup of such partitions, without using any knowledge of the native operating system or file system associated with that partition, and with all the concomitant problems of a traditional image backup. This limitation in the preferred embodiment is accepted as a conscious decision solely because such partitions are so rare in the NetWare environment as to be of little commercial interest, but clearly the techniques of the present invention could be applied to these other partition types if desired.

If a DOS FAT partition exists on the drive, it is backed up using an image backup in the preferred embodiment. As discussed in the next section, this approach greatly facilitates a complete restoration of both partitions of a failed disk drive, which is otherwise a very painful and time-consuming process on a NetWare system. In an alternate embodiment, the DOS partition may be backed up on a file-by-file basis.

In the preferred embodiment, each NetWare volume is backed up as a single logical image. The volume table is read and interpreted to understand which segments correspond to each volume, and the volume table is also saved at the beginning of the tape to allow a restoration to an identical physical segment/volume configuration if desired. However, each volume image can also be independently restored to any physical disk configuration with enough space to hold the image. Because each volume is read via the internal NetWare call (LogicalPartitionIO) that reads logical sectors, the hotfix map is automatically and transparently used by NetWare to present an image which is (normally) error-free and independent of any physical flaws.

To minimize the time required for subsequently mounting the backup image, the logical sector image of the volume is not stored in linear sector order on the tape. Instead, as shown in FIG. 3, all the logical sectors necessary for NetWare to perform the mount are saved in a FAT/directory header 122 at the beginning of the volume image on tape. Control information 120 identifying these sectors, as well as other information such as the time of the backup, is written along with the header. The set of sectors saved in the FAT/directory header 122 includes all the FAT blocks and the directory blocks of the volume. These blocks are identified by reading the volume table entry for the first segment of the volume, which contains pointers to the first FAT and directory blocks of the volume, and the FAT chain is then followed to identify all subsequent FAT and directory blocks. Actually, NetWare stores a duplicate ("mirror") copy of both the FAT and directory blocks, but these mirror copies are not included in the header, although they are backed up as part of the main volume data. After this header, the remaining logical sectors, comprising the file data 123, are appended in a monotonically increasing sector order.

Note that, in the preferred embodiment, it is not the case that all logical sectors are always included somewhere in the backup image. For example, in order to minimize backup time of partially full volumes, the preferred embodiment by default excludes logical blocks (and thus the associated logical sectors) which do not contain any file data, such as 124 in FIG. 3. The "empty" blocks are identified by scanning the FAT to see which FAT entries are zero. The user may override this operation to force all sectors to be included in the backup if desired. Similarly, in the preferred embodiment, the backup software will scan the directory entries for deleted files, which are retained by NetWare on a temporary basis. The data blocks, such as 125, associated with those deleted files will be excluded from the backup image to minimize backup time, unless the user overrides this default behavior.

Because the blocks are not logically ordered on tape, a block map table 121 is pre-computed using the FAT/directory information and stored along with the header, with one entry per logical block. Each entry 126 in this table indicates which tape block in the backup image corresponds to a given logical block. The table thus allows for instant lookup of the position of each logical block on the tape at restore time.

Figure 4:
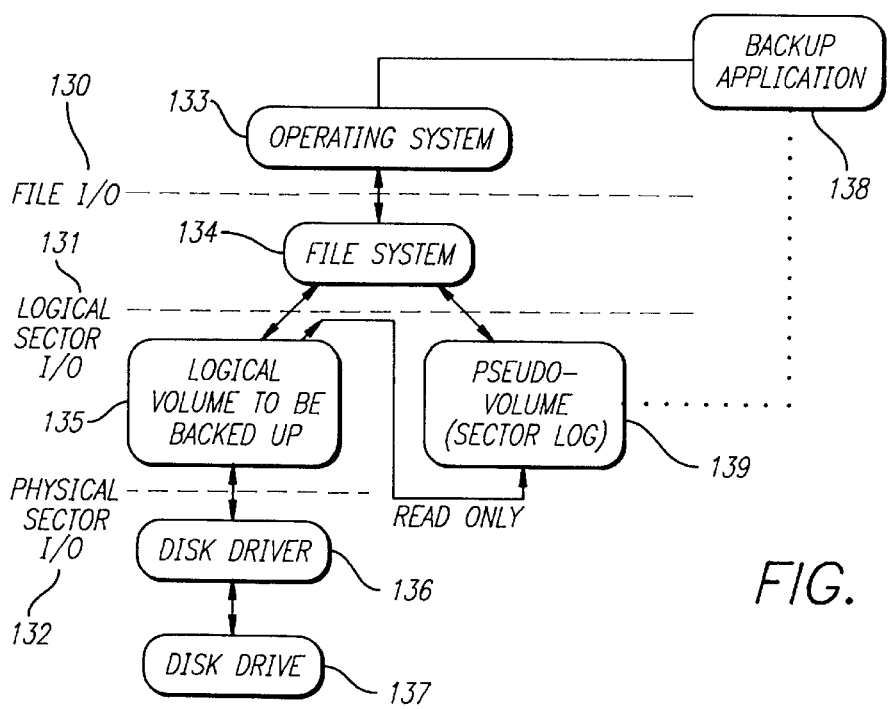
FIG. 4 is a block diagram of a pseudo-volume mount in accordance with the present invention.

In an alternate embodiment, where the on-disk structure for the file system is not known, the backup software can identify all the sectors required for mount (and save them in the tape FAT/directory header 122) using the technique shown in the block diagram of FIG. 4. First, the backup process presents a "pseudo-volume" 139 to the operating system 133 to be mounted read-only. Whenever a logical sector read call 131 is issued by the file system 134, the "disk driver" logic for the pseudo-volume 139 performs the read by instead reading logical sectors from the actual logical volume to be backed up 135. The pseudo-volume disk driver 139 maintains a log of which logical sectors are read during the mount process. If the file system mount process automatically reads all the directory and control structures for the disk (as in NetWare), after the pseudo-volume mount is completed this sector log identifies all the necessary sectors to be included in the tape image header. Otherwise, the backup application 138 will need to issue file system calls to force all such areas of the disk to be accessed so that these areas can be logged. For example, it may be necessary to "walk" over the entire directory tree structure of the disk using the normal findfirst/findnext file calls. Once the sector logging is complete, the backup application 138 uses this log to build the header 122 and proceeds to backup in a manner basically identical to that of the preferred embodiment. While this pseudo-volume approach does require a knowledge of the operating system entry points for logical sector reads 131, these entry points are normally well-documented as part of the device driver interface specifications, so this method requires much less effort than trying to understand completely an undocumented on-disk format.

The preferred embodiment also includes a mechanism to perform "incremental" image backups. A list of modified ("dirty") blocks is maintained by a separate NLM which tracks block write calls. With this technique only the blocks of the disk which have changed are read during an incremental backup and stored on the tape. It is absolutely imperative that this NLM be present at all times when the volume is mounted, or some writes may be missed, totally negating the integrity of all subsequent incremental backups until a new full backup is performed.

Figure 5:
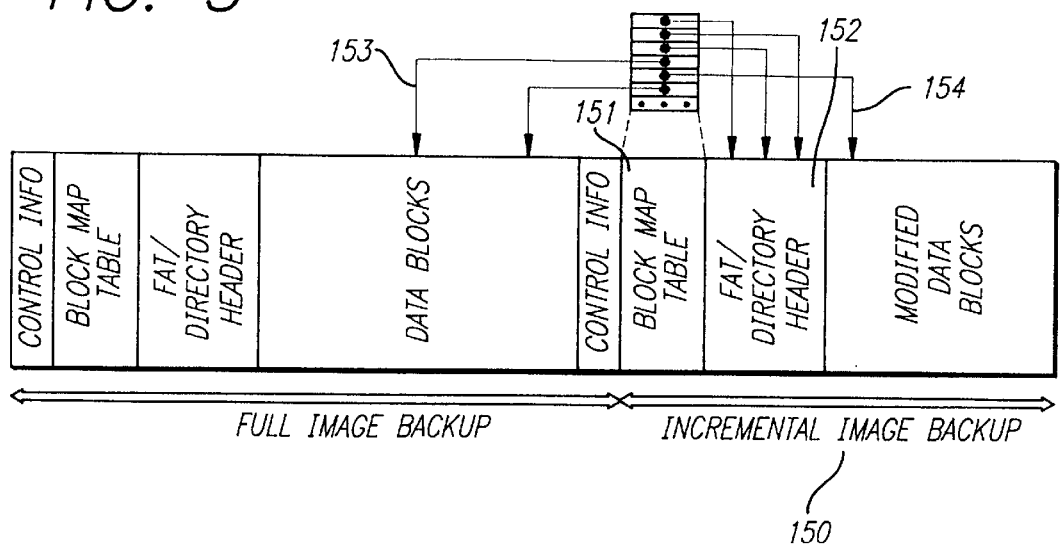
FIG. 5 is a diagram of the format on tape of a full image backup and an incremental image backup stored in accordance with the present invention.

As shown in FIG. 5, a complete block map table 151, together with all directory and FAT blocks 152, whether they have changed or not, are included in an incremental backup image 150, so that mounting the tape image is still fast. Each block map table entry points to the modified block in the incremental backup 154 if that block has changed, else it points to the original block 153 in the previous backup. To keep track of the modified blocks, the NLM simply maintains a bitmap (one bit per block) indicating which blocks in each volume have been written. For a 10 GB volume with 4 KB blocks, this amounts to only 320 Kbytes of bitmap, which can easily be kept in memory. The bitmap file, which is protected by a cyclic redundancy check (CRC) to verify that its contents have not been corrupted, is read from the DOS partition at startup (before any writes to the NetWare volume can have occurred) and then immediately deleted. At shutdown, after all the volume has been dismounted so that no further writes can occur, a new bitmap file is written back out to the DOS partition. Thus, if a power failure or some other disorderly shutdown occurs, the absence of a valid bitmap file indicates that the next backup must be a full backup. Otherwise, the bitmap indicates exactly which blocks have changed and therefore which blocks need to be included in the incremental backup. Note that using this incremental backup technique does not significantly affect restore time, although there is a small performance degradation on restore due to having what would otherwise be contiguous parts of the image on discontiguous portions of the tape. It is therefore recommended that full backups be performed regularly, perhaps on a weekly basis, to minimize the small cumulative performance degradation on restore.

In an alternate embodiment of incremental image backup, for each block stored on the tape, a checksum or CRC is also stored in a table which is appended to the backup image. Each checksum is large enough to provide a very high level of confidence that blocks with matching checksums are identical. For example, if each checksum consists of 128 bits, the probability of a false match for any given block is approximately $10^{-38}$; this actually gives much better reliability than the underlying tape and disk storage media, which typically have error rates on the order of $10^{-20}$. Fortunately, on high end CPUs such as a 486 or Pentium, such checksums can be computed much faster than data can be read from disk, assuming that the backup process is allowed to consume a significant fraction of the available CPU bandwidth. The checksums are used as follows. On backups subsequent to the original full backup, the checksums for each block are computed and compared to that of the original backup image. If the two checksums match, it is assumed that the two blocks match, so the new block is not stored on tape, but a pointer to the old block is saved in the block map table for this backup, which cannot be precomputed and is therefore appended to the tape image. If the two checksums do not match, the new block is included in the image backup. Note that this method does require that the entire disk image be read and thus is slower than the preferred embodiment. However, assuming that only a small fraction of the blocks on the disk has changed, this technique allows the incremental backup to proceed at speeds limited only by the disk read time, which is considerably faster than the tape write throughput which limits the speed of a full backup. While it has some obvious disadvantages, this embodiment is probably somewhat easier to implement than the preferred embodiment because it only involves application level code while the latter requires system-level resident code.

During any backup, file system consistency and integrity issues can arise if any files on the disk are modified. For example, in conventional file-by-file backup, if a file is open for write, the backup application typically skips that file and adds its name to an exception list that can be perused by the administrator. This situation alone is normally tolerable, although there are often files that are nearly always kept open (e.g., some database files) and therefore would never be backed up, which would clearly make the backup useless with respect to those files. An even more insidious situation can arise when dealing with files whose contents are interrelated, such as a database data file and its index file(s). If some of the files are backed up and then all the files are updated before the remaining files are backed up, the set of files on the backup tape are at best inconsistent and at worst dangerous to system integrity should they ever be restored and used. There is no perfect solution to all these problems other than to dismount the volume during backup, but only after each application responds to a broadcast of the impending dismount by updating and closing all its files in a consistent manner. However, such a solution is problematic because there are in general no such broadcasts or protocols used in NetWare, and because in many installations it is unacceptable to dismount the volume since some applications are required to be on-line at all times. Note that merely dismounting the volume without cooperation from applications is also an imperfect solution, because the applications may need to write some data to close their files in a consistent state.

In the preferred embodiment, there are two different user-selectable ways to handle this problem. Neither solution is perfect, but the combination of the two gives the user flexibility comparable to that of conventional file-by-file backup systems. The first option forces the volume being backed up to be dismounted while the image backup takes place. This approach has the potential disadvantages discussed above, but in some environments it provides a very acceptable solution. The second and more novel option is to "freeze" the volume during the image backup. In this case, the volume is kept on-line at all times, but all writes to the volume are temporarily suspended. Under NetWare 3.12, this suspension is implemented at the logical sector i/o call level (LogicalPartitionIO), which is already hooked by the backup software to read logical sectors. In Netware 4.1, in order to support Directory Services properly, the WriteFile and ModifyDirectoryEntry calls also need to be suspended in a similar fashion. Any application, including the operating system itself, which attempts to write to the drive will have its operation temporarily blocked, which does not hang the system since NetWare is a multi-tasking operating system. However, instead of suspending all writes to the volume during the entire backup process, which could be quite lengthy for large volumes, each write is suspended only until the point at which the logical sector number being read for backup exceeds the logical sector range of the requested write. Using this approach, the backup image is guaranteed to be identical to the disk image at the time when the backup started, but the system can resume somewhat normal operation before the operation is complete. In an alternate embodiment of this second approach, the driver maintains a small separate cache which is filled with "original" copies of blocks which are written during the backup. These original copies are then written to tape instead of the modified versions on disk, at which point the original block copy can be discarded to free up space in the cache. As long as the cache never fills up, no write operations will ever block, so this alternate approach may significantly limit (or even eliminate) the amount of time spent with blocked write calls in many cases, although clearly this depends on the size of the cache and the amount of write activity.

By monitoring system file status and file calls, the backup software of the preferred embodiment also keeps a list of files which were opened for write at the time the backup began and those which are created or opened for write during the backup. This list becomes the exception log, similar to that of a conventional file-by-file backup, which identifies those files whose contents on the backup may be invalid or inconsistent. There are, however, two significant differences between this exception log and that of a "conventional" exception log. First, the bad news: the time "window" during which a file will be added to the exception log in the preferred embodiment is considerably longer than in the conventional case, where the window for each file consists only of the time required to back up that one file. In other words, the exception log will tend to be somewhat longer in the preferred embodiment, all other things being equal. While this is a disadvantage of the present invention, it is not a very significant one in most cases. Second, the good news: the backup image of the preferred embodiment contains at least a version (albeit possibly invalid) of the contents of files on the exception list. In many instances, this version is actually perfectly good, but it almost always allows for partial recovery of the file contents which is often quite welcome after a catastrophic failure. By contrast, in the conventional case there is not even an inconsistent version available.

3. File-By-File Restore

Once a backup image has been written to tape, the preferred embodiment provides two simple methods for the user to recover individual files from tape without performing a full image restore. Both mechanisms are based on mounting the tape image as a NetWare volume, using a pseudo-disk driver. This is accomplished as shown in the block diagram of FIG. 6 and the flow charts of FIG. 7 and FIG. 8.

Figure 6:
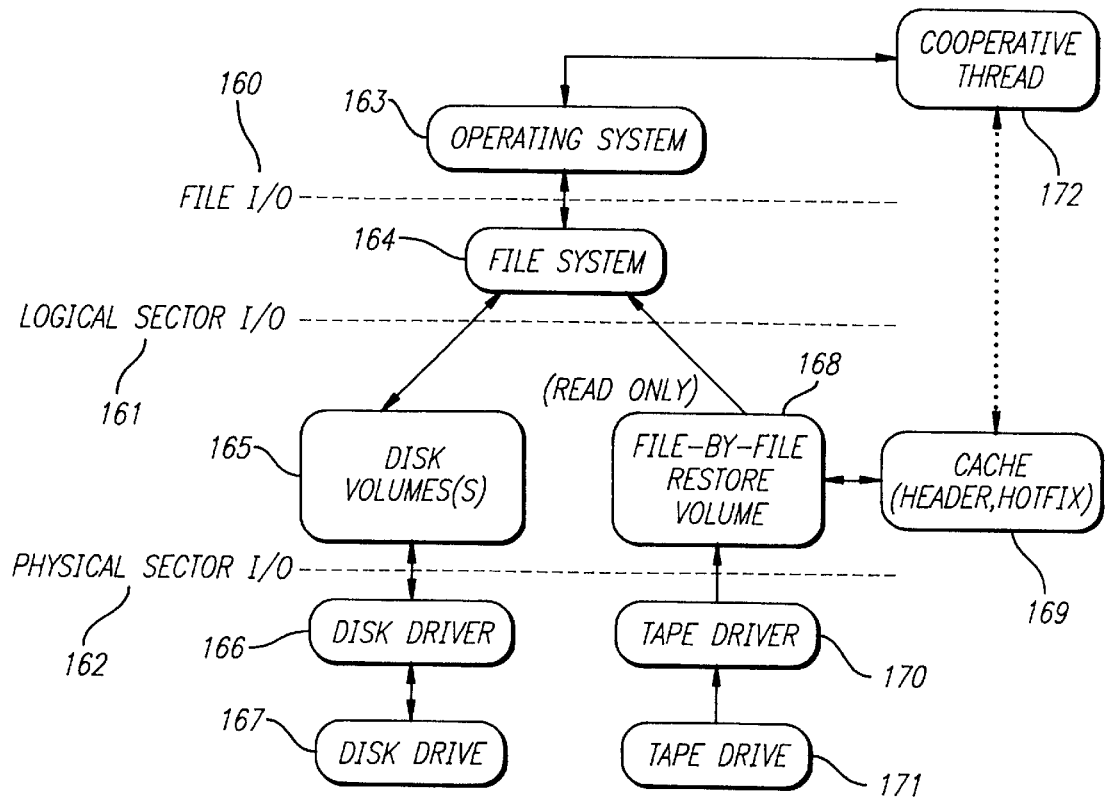
FIG. 6 is a block diagram of a file-by-file restore from an image backup, in accordance with the present invention.
Figure 7:
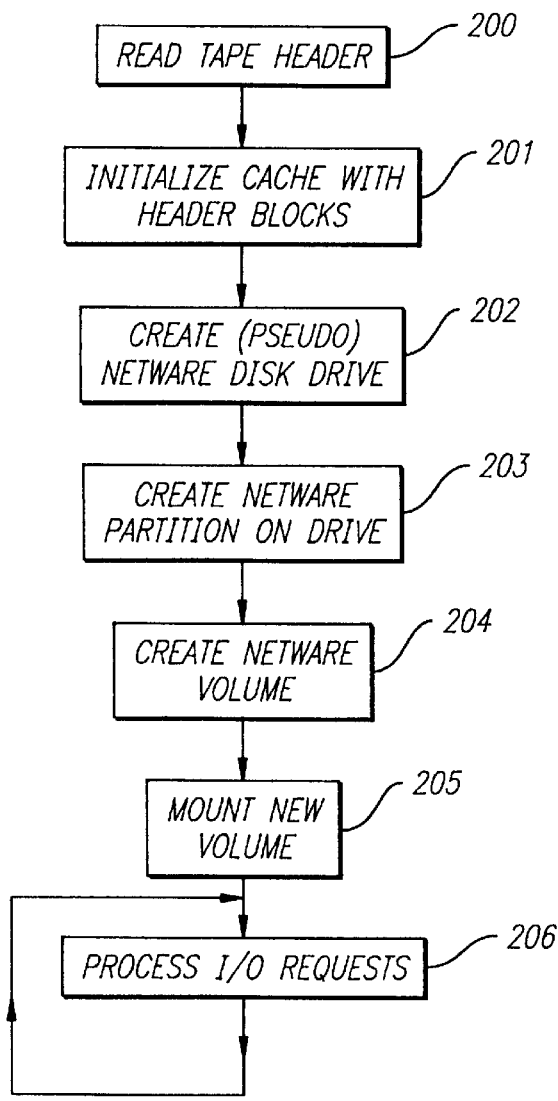
FIG. 7 is a flowchart illustrating the file-by-file restore process of the present invention.
Figure 8:
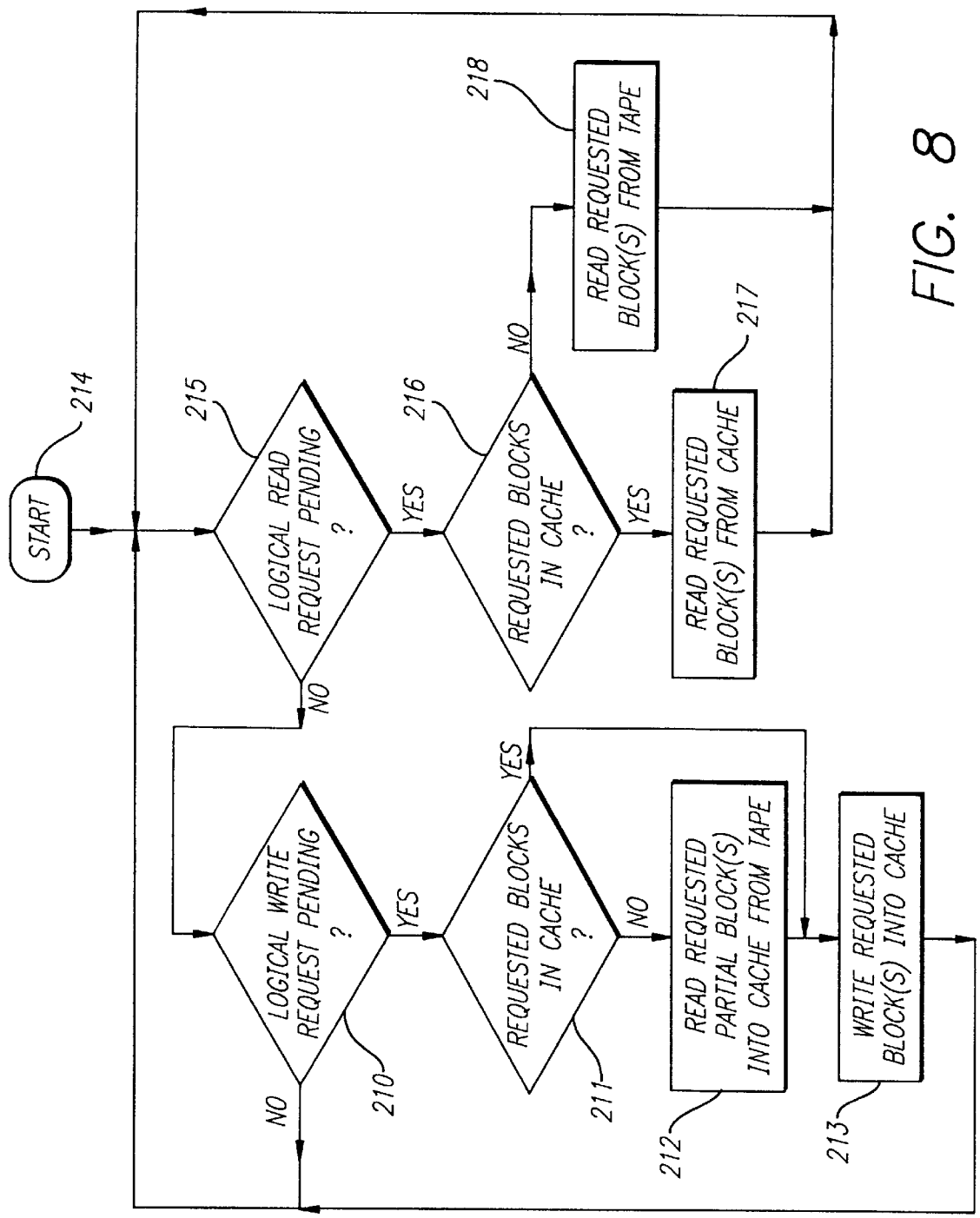
FIG. 8 is a flowchart illustrating the servicing of logical sector requests during file-by-file restore, in accordance with the present invention.

During pseudo-disk driver initialization at blocks 200 and 201 of FIG. 7, the entire tape header is read from the tape drive 171 via the tape driver software 170 into memory and entered into the cache 169. Since the header may be too large to fit into the memory allocated for the cache 169, the cache logic writes any excess data to a cache file on a NetWare volume 165 via calls to the operating system 163 and maintains data structures that can be used to locate the appropriate cache blocks in the cache file. After block 201, the logical read/write logic of FIG. 8 is enabled, as discussed below. At block 202 of FIG. 7, the restore software creates a (pseudo) internal NetWare drive 168 which is somewhat larger (by 50% in the preferred embodiment) than the original volume size. As shown in FIG. 6, the software "disk" driver for this new drive is added to the system using the NetWare AddDiskDevice call; the driver effectively reads from the tape image to process logical read requests 161 from the file system, but the cache 169 is used for the tape image header to minimize tape seek time. When a block in the header is requested, in most cases it will be in cache memory 169, but in the worst case an access to the cache file on disk drive 166 is required, which is much faster than accessing the same block on tape would be. In the preferred embodiment, since a NetWare disk driver cannot make file i/o calls directly, access to the cache file is achieved by posting a request to a separate cooperative thread 172 which does not operate at the driver level and thus can fulfill the request. During its initialization, the driver also loads in the block map table 121 from tape 171 and holds it in memory so that the location of each block on the tape can be instantly determined.

Logical sector reads and writes 161 are handled by the pseudo-disk driver 168 as outlined in FIG. 8. Starting at block 214, the disk driver continually polls at 210 and 215 for any pending read or write requests from the operating system 164. When a read request is found, processing continues at block 216. At this point, if the requested disk blocks are in the cache, processing continues at block 217, where the blocks are read directly from the cache 169, which may result in an access to the disk volume 165 via the cooperative thread 172. If the requested disk blocks are not in the cache at 216, processing continues at block 218, where the blocks are read from tape. After blocks 217 and 218, processing continues back to the beginning at block 215. When a write request is found at block 210, processing continues to block 211, where a check is made for the presence of the disk blocks in the cache. If the disk blocks are already in the cache, processing continues at block 213. If the disk blocks are not already in the cache, processing continues to block 212, where any partial disk blocks of the request are read from tape into the cache. Note that full disk blocks to be written do not need to be fetched from tape into the cache, since the entire disk block contents will be overwritten in the cache anyway. From block 212, processing continues to block 213, where the requested disk block writes are posted to the cache. All of these cache operations may result in blocks being read from or written to the disk volume 165 via the cooperative thread 172. Such cache operations are well understood in the art, and there are well-known caching strategies that may be employed without affecting the scope of the invention. From block 213, processing continues back to the beginning at block 215.

As shown in block 203 of FIG. 7, the driver next creates a NetWare partition (using the MM_CreatePartition NetWare call) large enough to hold a default hotfix size and the volume size. Creation of this (pseudo) partition will result in writes to initialize the hotfix and volume table areas of the partition. These writes are also cached by the cache logic 169, and will effectively be discarded when the tape volume is eventually dismounted. Once this partition is created, the driver issues calls at 204 to create a NetWare volume (writing the volume information using the LogicalPartitionIO call) with a size matching the size of the volume that was backed up, which results in a new volume table entry being written to the partition (and cached by the driver). Finally, a command-line request is issued to NetWare to mount the new volume at 205. At this point, the driver for the "tape" volume 168 enters a loop 206 processing logical sector i/o requests 161; since the driver knows the exact location of each block (in the cache memory 169, in the cache file on disk 167, or on the tape 171), it can easily satisfy all read/write requests, as shown in FIG. 8. Only reads/writes of file contents will result in accessing the tape 171 at blocks 218 and 212, since all the directory and FAT information is in the cache (169 or 167). Note that, if the header blocks were not consolidated in one contiguous region at the beginning of the tape image, this mounting process could require many minutes of tape seeking. Given the way the header blocks are stored in the preferred embodiment, only a single tape seek is required, to the beginning of the tape image, so the additional overhead beyond that required for mounting a similar disk volume is usually measured in seconds (or tens of seconds) instead of minutes.

Observe that, under NetWare, file read accesses to the "tape" volume 168 often result in sector-level write accesses. For example, NetWare maintains a last-accessed date for each file which is updated (i.e., written) each time a file is accessed. Similarly, under NetWare version 4, files may be compressed, and read accesses may result in the file contents being decompressed and written to disk. Thus, the cache 169 and its associated logic allow for arbitrary write access, since the cache can grow dynamically (limited by the amount of free space on the disk volume 165). In the preferred embodiment, the user is not given write access to the volume 168, simply because of the possible confusion caused by the transient nature of such writing, but in an alternate embodiment this somewhat arbitrary restriction can be removed to allow the user to modify the transient image of the mounted volume 168.

Once the new volume 168 is mounted, the user may access files on the "tape volume" using any of his normal file tools, such as Windows file manager. Applications can even be run from the tape volume just as if they resided on disk. In practice, although retrieving files from the tape volume is very slow compared to retrieval times from a disk volume, the time required to restore only a few files or a single subdirectory seems to be quite acceptable; i.e., comparable to the restore time from a conventional file-by-file backup. In fact, often the total restore time is less, because the user can easily peruse the file/directory tree using his own tools to decide which files to restore instead of using a "foreign" restore tool.

However, in the worst case of a large set of files or a set of files which is fragmented (i.e., spread all over the tape), the extra tape seeks can significantly degrade restore performance. To handle this case, the preferred embodiment offers an alternate method for restoring individual files which, from the user's perspective, operates identically to a conventional restore from a file-by-file backup. Instead of giving the user direct access to the mounted volume, a dedicated restore application allows the user to select ("tag") the files he wishes to restore. This application then examines the volume structure, looking at the FAT and directory entries for the tagged files to determine an optimal ordering for restore. In fact, simply by ordering the restore process at the block level instead of the file level, the restore application can guarantee that the entire tagged file set is restored with no more than a single pass over the tape, which is as good as the guarantee of any file-by-file system.

Thus, the present invention allows greater flexibility in restoring individual files than a conventional file-by-file approach, while at the same time offering comparable (or better) restore performance.

4. Image Restore

As part of the backup process in the preferred embodiment, a set of disaster-recover floppy disks can be created which allow the user to boot DOS from floppy and load enough of NetWare to access the original tape drivers so that the disk partitions can be restored. This set of boot floppies typically only needs to be built once, or at most every time the NetWare device driver configuration is changed. In the case of a catastrophic hardware failure, the user invokes the restore procedure shown in the flow chart of FIG. 9 by installing a new (unformatted) hard disk, inserting the disaster-recovery floppies, allowing a full restore of the entire disk configuration and contents as they were at the time of the last backup. Using conventional file-by-file backup, such a recovery process requires the user first to re-install DOS, then to re-install NetWare, including all the customizations and drivers which are particular to the given server's configuration, then finally to restore all the files from tape. It is not uncommon for this such a procedure to consume days of experimentation to re-configure the system properly. By contrast, use of the disaster-recovery floppies in the preferred embodiment reduces the time to minutes or hours at most, depending on the backup image size, without any manual intervention or configuring.

Figure 9:
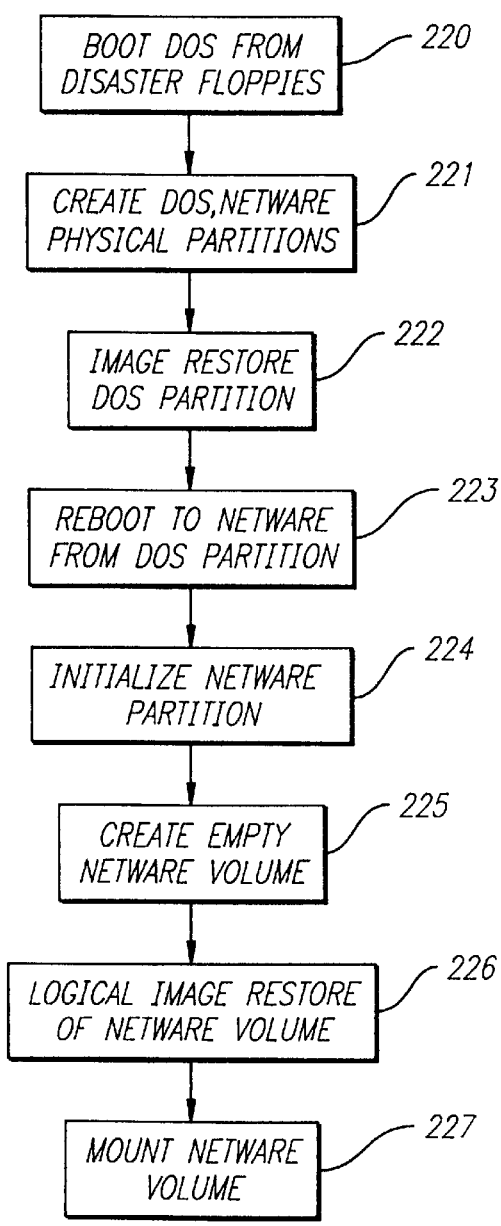
FIG. 9 is a flowchart illustrating the image restore process of the present invention.

Normally, after rebooting from the disaster recovery diskettes at block 220 of FIG. 9, the next step in restoring the volume image from tape is to partition the disk into a DOS and a NetWare partition, as shown in block 221. From block 221, processing continues to block 222, where the contents of the DOS partition are restored. Since the on-disk structure for a DOS FAT volume is entirely documented, the methods described here for allowing mount of a volume tape image could easily be applied to allow a file-by-file restore from the image backup of the DOS partition. However, the DOS partition on a NetWare system is typically quite small and does not contain many files that are accessed directly by the administrator, so in the preferred embodiment this functionality is not implemented. Also, because the DOS partition is so small, usually no disk flaws are encountered during a conventional image restore of the DOS partition, particularly given that a replacement disk would almost certainly be a modern disk drive in which initial flaw mapping can be performed automatically and transparently. In the extremely rare event that the flaw map on the new partition is incompatible with the original image backup and cannot be fixed by internal drive flaw management, the DOS restore logic would have to interpret the disk structure from the tape image to pull off the DOS files and restore them to the newly formatted partition, avoiding the flaws. Those of ordinary skill in the art will understand the steps necessary to implement this. However, because the probability of encountering this potential problem is so small, as explained above, the functionality to handle this worst-case eventuality is unlikely to ever be necessary.

The alternate embodiment discussed in the above section on backup, in which a file-by-file backup is performed on the DOS partition, allows file-by-file restore if desired, as well as the ability to resize the DOS partition on a new disk on restore. Unlike the preferred embodiment, this alternate embodiment would also require some software to format the DOS partition logically before restoring all of the files.

Once the DOS partition is restored, in the preferred embodiment the system is rebooted from the DOS partition at block 223 to bring up the full NetWare environment that existed at the time of the image backup. The restore software calls NetWare (MM_CreatePartition, MM_InitializePartitionTable) at block 224 to initialize the NetWare partition(s) on the physical disk drive(s); this step builds the hotfix area and an empty volume table. For each volume selected by the user to be restored from the tape, the restore software calls NetWare (using LogicalPartitionIO) at 225 to create a new (empty) volume of equal or greater size, which may span multiple segments, depending on the disk configuration and the user's preferences. The logical sector image of the original volume is then read from tape at 226 and written to the appropriate segment(s) via the internal NetWare logical sector i/o call (LogicalPartitionIO). Once all the sectors have been restored to the disk, the restore software issues a NetWare command-line call at 227 to mount the restored volume. At this point, the volume is available for access. When all the requested volumes have been restored, the restore software exits and the system is back in its original state at the time of the backup.

In the preferred embodiment, this entire process, including booting from floppy and restoring the DOS and Novell volumes, is totally automatic, other than the fact that the user must specify which volumes get restored and remove the boot diskette to allow the final reboot to occur. The process is so much simpler than a full system restore from a conventional file-by-file backup that several interesting applications of this type of restore become feasible. For example, it is possible to restore the volumes to a separate ("spare") server computer just to peruse and use the backup data without affecting the original server. Similarly, this technique can be used to transfer the file contents of an existing server to a new server, presumably with higher performance and capacity, which is to replace the existing server. As another example, an image backup tape would allow a vendor or technician to install a new server containing a pre-configured set of network applications at a customer site. Today such an operation usually involves the painful procedure of partitioning the disk, installing DOS, installing NetWare, then installing the applications, and this process must be repeated for each new customer. Using the present invention, the vendor could perform the installation once at his headquarters, then have a technician simply perform the image restore at each customer site, resulting in a considerable savings in time and money.

In the case where only the NetWare partition(s) need to be restored (but not the DOS partition), the basic flowchart of FIG. 9 is used, but blocks 220, 222, 223, and part of 221 (creating the DOS partition) are skipped. This case occurs for example when the contents of the NetWare partition are lost or deleted through user error or a system crash, but the DOS partition is not corrupted.

The invention has been described in an exemplary and preferred embodiment, but is not limited thereto. Those skilled in the art will recognize that a number of additional modifications and improvements can be made to the invention without departure from the essential spirit and scope. The scope of the invention should only be limited by the appended set of claims.

We claim:

1. A method for backing up data in a computer system from a primary storage means to a backup storage means on a sector-by-sector basis and restoring data in a computer system from said backup storage means to a restore storage means on a sector-by-sector basis, said method comprising the steps of:

reading a set of logically contiguous sectors from the primary storage means using a software call of the operating system that provides access to the files stored on said primary storage means, said call of said operating system performing any physical level remapping necessary to avoid previously detected physical flaws on said primary storage means, writing said set of logically contiguous sectors to said backup storage means, creating a partition on said restore storage means of a size at least as large as the size of said primary storage means, reading a set of logically contiguous sectors from a location on said backup storage means, writing said set of logically contiguous sectors to said partition of said restore storage means using a software call to the operating system that provides access to the files stored on said partition of said restore storage means, said call of said operating system performing any physical level remapping necessary to detect and avoid physical flaws on said restore storage means.

2. The method of claim 1, further including the steps of writing on said backup storage means a sector directory table containing information sufficient to indicate the size of said primary storage means and the location of each logical sector written to said backup storage means, reading said sector directory table from said backup storage means, using said sector directory table to determine the sector numbers and locations of said logically contiguous blocks to be read.

3. The method of claim 2 wherein said primary storage means consists one or more disk drive partition(s) in said computer system, and wherein said operating system call to read said logically contiguous sectors performs the mapping necessary to locate said logically contiguous sectors on said disk drive partition(s).

4. The method of claim 2 wherein said partition created on said restore storage means is larger than the size of said original primary storage means.

5. The method of claim 2 wherein said partition created on said restore storage means spans multiple physical disk drives.

6. The method of claim 2 wherein unused sectors that do not contain file data are not read from said primary storage means and are not stored on said backup storage means, and wherein the absence of said unused sectors on the backup storage means is indicated in said sector directory table.

7. The method of any of claims 1–6 wherein deleted sectors that contain data from deleted files are not read from said primary storage means and are not stored on said backup storage means, and wherein the absence of said deleted sectors on the backup storage means is indicated in said sector directory table.

8. The method of any of claims 1–6 wherein an open file log is maintained of all files which are opened for write while the backup method is in process.

9. The method of claim 8 wherein said open file log is written to said backup storage means.

10. The method of any of claims 1–6 wherein said operating system allows multi-tasking, further including the step of:

temporarily suspending execution of any tasks that attempt to write a set of sectors to said primary storage means until said set of sectors has been read from said primary storage means by the backup task in preparation for writing said sectors to said backup storage means.

11. The method of claim 10, further including the steps of:

maintaining a cache of sectors read from said primary storage means to be written to said backup storage means, detecting an attempted write by a task to a set of sectors of said primary storage means which has not yet been backed up, operative when said sector cache is full, temporarily suspending executing of said task, operative when said sector cache is not full, reading said set of sectors and adding said set of sectors to said sector cache and then allowing said task to continue execution without suspension, checking said sector cache for the presence of any portion of said set of logically contiguous sectors to be read from said primary storage means, operative when no such portion is found in said sector cache, reading said set of logically contiguous sectors from said primary storage means, operative when such portion is found in said sector cache, reading said portion(s) of said set of logically contiguous sectors from said sector cache, and reading remaining portions not found in said sector cache from said primary storage means, whereby no said tasks attempting to write to said primary storage means will be suspended unless said sector cache is full.

12. The method of claim 11 wherein said portions of said set of logically contiguous set of sectors found in said sector cache are removed from said sector cache after said portions are read from said sector cache, whereby portions of said sector cache may be re-used in order to minimize the number of times that tasks are suspended.

13. The method of any of claims 1–6 wherein only sectors that have changed since the last backup are written to the backup storage means.

14. The method of claim 13 wherein detection of changed sectors further includes the following steps:

computing a checksum (or similar type of function) on groups of sectors read from said primary storage means, comparing said checksum with the corresponding checksum stored from the previous backup, operative when the two checksums do not match,
      writing said group of sectors to said backup storage means,
      writing said checksum to said backup storage means,
   operative when the two checksums do match,
      setting the entry (or entries) in said sector directory table corresponding to said group of sectors to point to the corresponding group of sectors from said previous backup.

15. The method of claim 13 wherein detection of changed sectors further includes the following steps:

activating monitor software to detect all writes to said primary storage means, maintaining a dirty sector table indicating which groups of sectors on said primary storage means have been modified, using said dirty sector table to determine which groups of sectors have been changed, operative when said dirty sector table indicates that said group of sectors to be backed up has been modified, writing said group of sectors to said backup storage means, operative when said dirty sector table indicates that said group of sectors to be backed up has not been modified, setting the entry in said sector directory table corresponding to said group of sectors to point to the corresponding group of sectors from said previous backup, saving said dirty sector table to an auxiliary storage means when said monitor software is deactivated at system shutdown.

16. The method of claim 15 wherein said auxiliary storage means is the same as said primary storage means.

17. The method of any of claims 15 further including the following steps:

operative when said monitor software is deactivated,
   computing a checksum on the contents of said dirty sector table,
   saving said checksum on said auxiliary storage means,
   operative when said monitor software is activated,
   performing a validity check on said contents of said dirty sector table using said checksum,
   invalidating said checksum on said auxiliary storage means.

18. The method of claim 17 further including the steps of:

operative when said monitor software is deactivated,
   saving an indicator of the time of said deactivation on said auxiliary storage means,
   operative when said monitor software is activated,
   verifying that the operating system has not been active to allow writes to said primary storage means since the last time a valid dirty sector table was written to said auxiliary storage means,
   operative when said verification fails, invalidating the contents of said dirty sector table.

19. The method of any of claims 18 wherein the failure of any checks on the validity of the contents of said dirty sector table results in all sectors being marked as having been modified, whereby a complete backup is performed.

20. The method of any of claims 1–6, further including the steps of:

creating a removable disk which contains all files necessary to boot said computer system into said operating system, including software drivers that allow access to said primary storage means and said backup storage means, booting said computer system using said removable disk.

21. A method for backing up data in a computer system from a primary storage means to a backup storage means on a sector-by-sector basis and for providing file-by-file access to said data on said backup storage means, said method comprising the steps of:

reading a set of logically contiguous sectors from the primary storage means using a software call of the operating system that provides access to the files stored on said primary storage means, said call of said operating system performing any physical level remapping necessary to avoid previously detected physical flaws on said primary storage means, writing said set of logically contiguous sectors to said backup storage means, identifying a control set of logical sectors of said primary storage means, said control set including sectors required to mount said primary storage means for file access by said operating system or to traverse the directory structure of the files on said primary storage means, re-ordering the sequence of writing said sets of logically contiguous sectors on said backup storage means in order to group sectors of said control set in closer physical proximity to one another on said backup storage means than would occur if said sequence were ordered strictly by logical sector number, caching said control set of logical sectors from said backup storage means to allow fast random access to said control set, creating a virtual disk partition of said operating system, servicing logical sector read requests on said virtual disk partition, operative when a sector of said read request is part of said control set, reading said sector from said control cache, operative when a sector of said read request is not part of said control set, reading said sector from said backup storage means, mounting said virtual disk partition as a disk volume of said operating system, whereby files on said disk volume may be accessed using normal operating system calls and utilities.

22. The method of claim 21, further including the steps of:

writing on said backup storage means a sector directory table containing information sufficient to indicate the size of said primary storage means and the location of each logical sector written to said backup storage means, reading said sector directory table from said backup storage means, using said sector directory table to determine the locations of said sectors when servicing logical sector read requests.

23. The method of claim 22 wherein said primary storage means consists one or more disk drive partition(s) in said computer system, and wherein said operating system call to read said logically contiguous sectors performs the mapping necessary to locate said logically contiguous sectors on said disk drive partition(s).

24. The method of claim 22 wherein unused sectors that do not contain file data are not read from said primary storage means and are not stored on said backup storage means, and wherein the absence of said unused sectors on the backup storage means is indicated in said sector directory table.

25. The method of claim 24 wherein deleted sectors that contain data from deleted files are not read from said primary storage means and are not stored on said backup storage means, and wherein the absence of said deleted sectors on the backup storage means is indicated in said sector directory table.

26. The method of claim 21 wherein an open file log is maintained of all files which are opened for write while the backup method is in process.

27. The method of any of claims 21–26 wherein said open file log is written to said backup storage means.

28. The method of any of claims 21–26 wherein said operating system allows multi-tasking and further including the step of:

temporarily suspending execution of any tasks that attempt to write a set of sectors to said primary storage means until said set of sectors has been read from said primary storage means by the backup task in preparation for writing said sectors to said backup storage means.

29. The method of claim 28, further including the steps of:

maintaining a cache of sectors read from said primary storage means to be written to said backup storage means, detecting an attempted write by a task to a set of sectors of said primary storage means which has not yet been backed up, operative when said sector cache is full, temporarily suspending executing of said task, operative when said sector cache is not full, reading said set of sectors and adding said set of sectors to said sector cache and then allowing said task to continue execution without suspension, checking said sector cache for the presence of any portion of said set of logically contiguous sectors to be read from said primary storage means, operative when no such portion is found in said sector cache, reading said set of logically contiguous sectors from said primary storage means, operative when such portion is found in said sector cache, reading said portion(s) of said set of logically contiguous sectors from said sector cache, and reading remaining portions not found in said sector cache from said primary storage means, whereby no said tasks attempting to write to said primary storage means will be suspended unless said sector cache is full.

30. The method of claim 29 wherein said portions of said set of logically contiguous set of sectors found in said sector cache are removed from said sector cache after said portions are read from said sector cache, whereby portions of said sector cache may be re-used in order to minimize the number of times that tasks are suspended.

31. The method of any of claims 21–26 wherein only sectors that have changed since the last backup are written to the backup storage means.

32. The method of claim 31 wherein detection of changed sectors further includes the following steps:

computing a checksum (or similar type of function) on groups of sectors read from said primary storage means, comparing said checksum with the corresponding checksum stored from the previous backup, operative when the two checksums do not match,
    writing said group of sectors to said backup storage means,
    writing said checksum to said backup storage means, operative when the two checksums do match, setting the entry (or entries) in said sector directory table corresponding to said group of sectors to point to the corresponding group of sectors from said previous backup.

33. The method of claim 31 wherein detection of changed sectors further includes the following steps:

activating monitor software to detect all writes to said primary storage means, maintaining a dirty sector table indicating which groups of sectors on said primary storage means have been modified, using said dirty sector table to determine which groups of sectors have been changed, operative when said dirty sector table indicates that said group of sectors to be backed up has been modified, writing said group of sectors to said backup storage means, operative when said dirty sector table indicates that said group of sectors to be backed up has not been modified, setting the entry in said sector directory table corresponding to said group of sectors to point to the corresponding group of sectors from said previous backup, saving said dirty sector table to an auxiliary storage means when said monitor software is deactivated at system shutdown.

34. The method of claim 33 wherein said auxiliary storage means is the same as said primary storage means.

35. The method of claim 33 further including the following steps:

operative when said monitor software is deactivated, computing a checksum on the contents of said dirty sector table, saving said checksum on said auxiliary storage means, operative when said monitor software is activated, performing a validity check on said contents of said dirty sector table using said checksum, invalidating said checksum on said auxiliary storage means.

36. The method of claim 35 further including the steps of:

operative when said monitor software is deactivated, saving an indicator of the time of said deactivation on said auxiliary storage means, operative when said monitor software is activated, verifying that the operating system has not been active to allow writes to said primary storage means since the last time a valid dirty sector table was written to said auxiliary storage means, operative when said verification fails, invalidating the contents of said dirty sector table.

37. The method of claim 36 wherein the failure of any checks on the validity of the contents of said dirty sector table results in all sectors being marked as having been modified, whereby a complete backup is performed.

38. The methods of claims 21–26 wherein said control set is identified by using a knowledge of the file and allocation format of said primary storage means under said operating system.

39. The method of any of claims 21–26 wherein said control set is identified without a complete knowledge of said file and allocation format of said primary storage means, using a pseudo-drive technique which includes the following steps:

creating a temporary virtual disk partition of said operating system, servicing logical sector read requests on said temporary virtual disk partition by performing reads of the corresponding sectors of said primary storage means, monitoring the set of logical sectors that are read from said temporary virtual disk partition and adding each sector read to said control set, mounting said temporary virtual disk partition as a temporary disk volume of said operating system.

40. The method of claim 39, further including the step of using operating system calls to traverse the entire directory tree of said temporary disk volume.

41. The method of any of claims 21–26 wherein some knowledge of said file and allocation format is used to eliminate duplicate copies of structures in said primary storage means from said control set, whereby the size of said control set is minimized.

42. The method of any of claims 21–26 wherein writes to said disk volume are allowed by caching said writes to a temporary storage means.

43. The methods of claim 31 wherein said backup storage means can also be used to perform a sector-by-sector restore as in claim 1.

* * * * *